United States Patent
Focke et al.

(10) Patent No.: US 6,554,026 B1
(45) Date of Patent: Apr. 29, 2003

(54) DEVICE FOR CONTROLLING FLOWING MEDIA

(75) Inventors: Heinz Focke, Verden (DE); Burkard Roesler, Blender (DE)

(73) Assignee: Focke & Co. (GmbH & Co.) (DE)

( * ) Notice: Subject to any disclaimer, the term of this patent is extended or adjusted under 35 U.S.C. 154(b) by 0 days.

(21) Appl. No.: 09/937,226

(22) PCT Filed: Feb. 25, 2000

(86) PCT No.: PCT/EP00/01600

§ 371 (c)(1),
(2), (4) Date: Sep. 21, 2001

(87) PCT Pub. No.: WO00/58650

PCT Pub. Date: Oct. 5, 2001

(30) Foreign Application Priority Data

Mar. 25, 1999 (DE) .......................................... 199 13 689

(51) Int. Cl.$^7$ .............................................. F16K 11/22
(52) U.S. Cl. .............................. 137/596.15; 137/596.18
(58) Field of Search ........................ 137/596.14, 596.15, 137/596.16, 596.18

(56) References Cited

U.S. PATENT DOCUMENTS

| | | | |
|---|---|---|---|
| 3,763,862 A | * 10/1973 | Spieth | ........................ 251/61.1 |
| 4,221,361 A | 9/1980 | Weingarten | |
| 4,454,893 A | 6/1984 | Orchard | |
| 4,516,604 A | * 5/1985 | Taplin | .................... 137/596.15 |
| 4,703,913 A | * 11/1987 | Hunkapiller | ................. 137/885 |
| 4,717,117 A | 1/1988 | Cook | |
| 4,848,722 A | * 7/1989 | Webster | ....................... 137/885 |
| 5,083,742 A | * 1/1992 | Wylie et al. | ................. 137/885 |
| 5,391,353 A | * 2/1995 | Graffunder | ................... 137/885 |

FOREIGN PATENT DOCUMENTS

| | | |
|---|---|---|
| DE | 2232664 C2 | 6/1983 |
| DE | 4007427 A1 | 10/1990 |
| EP | 0706003 A2 | 4/1996 |
| FR | 1232673 | 10/1960 |
| WO | WO 98/45629 | 10/1998 |

\* cited by examiner

*Primary Examiner*—Gerald A. Michalsky
(74) *Attorney, Agent, or Firm*—Technoprop Colton LLC

(57) ABSTRACT

A valve for controlling flowing media, in particular suction air used in connection with suction heads or the like, in which closing diaphragms (17, 18) made from elastically deformable material are disposed within a valve housing (10) and are subjected to the action of compressed air via actuating lines (14, 15) in the closing or blocking direction, such that when each diaphragm (17, 18) moves into an open position, a subatmospheric pressure is generated on the side ling opposite the closing side.

21 Claims, 4 Drawing Sheets

DEVICE FOR CONTROLLING FLOWING MEDIA

BACKGROUND OF THE INVENTION

1. Technical Field

The invention relates to a device for the control of flowing media, in particular a vacuum valve, having closing elements, movable within a valve housing, for valve apertures and having lines adjoining the valve housing, specifically a supply line leading to a (vacuum) pump and a consumer line or suction line leading to a consumer.

2. Prior Art

Valves for flowing media, in particular compressed air or vacuum, are in many cases equipped with a rigid closing element movable within a valve housing. This is customarily spring-loaded in one direction, for example in the closing direction. As a result, opening and closing movements are sluggish, so that short cycle times are not possible in the long term.

BRIEF SUMMARY OF THE INVENTION

It is an object of the invention to propose a valve which permits a simple design and actuation of closing elements and is efficient in the long term.

To achieve this object, the (vacuum) valve according to the invention is characterized in that at least one closing element is formed as an elastically deformable shaped piece, in particular as an elastic diaphragm, which can be moved into an open or a closed position by reason of elastic deformation by being subjected to the action of a pressure medium.

The diaphragm, as a closing element, is sealingly clamped along an annular circumferential edge and can be deformed by being subjected unilaterally to the action of a pressure medium, in particular of compressed air, until it comes to bear on a valve seating.

The vacuum valve according to the invention is preferably employed for the controlling of air in lifting heads with suction elements to pick up articles. The vacuum valve is particularly suitable for controlling the vacuum at individual suction heads of a suction lifter, as is illustrated for example in U.S. Pat. No. 5,666,786.

A special feature of the invention lies in the concept of piloting of the valve. The use of a pilot valve ensures that subatmospheric pressure is always active when the (two) diaphragms are switched over. Specifically, the diaphragms are each deformed into an open position by subatmospheric pressure and into the closed position by compressed air. As a result, very rapid working cycles of the valve are possible.

According to an advantageous embodiment of the vacuum valve, a flow pipe is positioned within the housing, one diaphragm being assigned as a closing element to each of its two ends. The diaphragms are supplied with compressed air from the central compressed air supply of the (packaging) machine. As a result of the actuation of one or the other diaphragm, and closing of one or the other end of the flow pipe caused thereby, a suction line leading to the lifting head or to the suction heads is connected to a supply line leading to the vacuum pump or the suction line of the suction heads is vented.

BRIEF DESCRIPTION OF THE DRAWINGS

Further details of the invention relate to the construction and mode of operation of the valve. An example of embodiment thereof is described in detail below with reference to the drawings, in which.

DETAILED DESCRIPTION OF THE PREFERRED EMBODIMENTS

Figure 1:
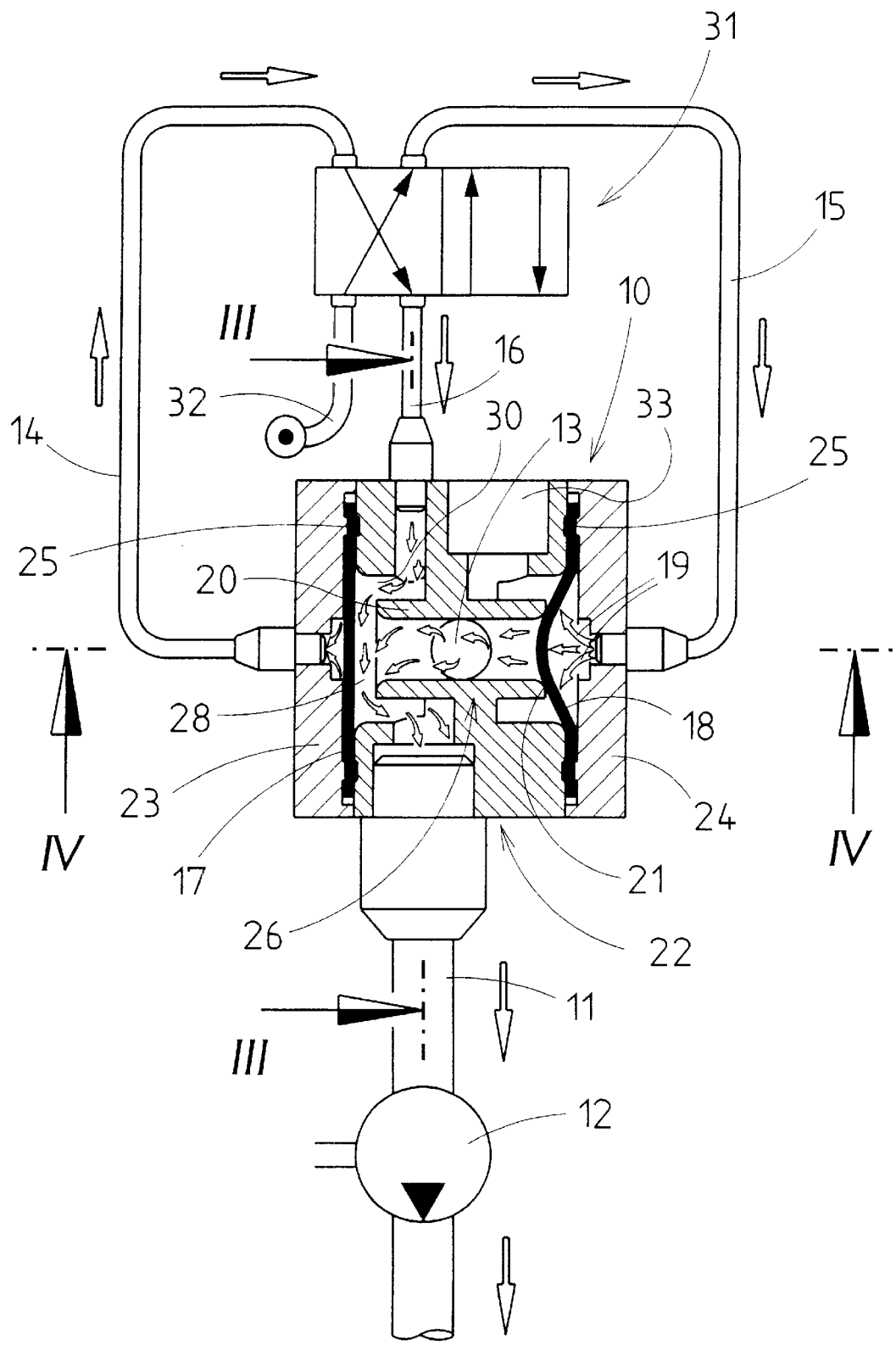
FIG. 1 shows a (vacuum) valve in vertical section.

The valve illustrated as an example of embodiment has a cuboid valve housing 10. This is adjoined on various sides by supply lines and actuating lines. Affixed to the underside of the valve housing 10 is a supply line 11 which leads to a vacuum pump 12 and accordingly is in functional terms a suction line. A consumer line, specifically a suction line 13, adjoins a transversely lying, upright lateral surface and in the preferred example of embodiment leads to a suction head of a suction lifter (not shown) of a packaging robot. Actuating lines 14, 15 for valve and closing elements are affixed to mutually opposite (upright) lateral surfaces. These are compressed air lines. In the region of an upper side a compensation line 16 is connected to the valve housing 10.

Formed within the valve housing 10 are passage apertures or flow passages that can be blocked by closing elements. These closing elements are in the present case in the form of diaphragms 17, 18 made from elastically deformable or extensible material, for example from rubber or plastic. The disc-shaped diaphragms 17, 18 are sealingly and fixedly secured along an outer edge. An inner, central region is left free. To actuate a diaphragm 17, 18 as a closing element, the diaphragm 17, 18 is subjected on one (outer) side to the action of a flowing pressure medium, specifically compressed air (arrows 19). As a result, swelling deformation of the diaphragm 18 in question takes place until it comes to bear on a valve seating 20 or 21. The valve seating 20, 21, in the form of an annular circle with a rounded surface, is sealed all around by the diaphragm 17, 18. The compressed air to actuate the diaphragm 17, 18 is fed through the actuating line 14, 15, through the actuating line 15 to the diaphragm 18 in the position shown in FIG. 1.

The valve housing 10 consists of a core piece 22 and two lateral cover plates 23, 24. The latter serve first to fix the diaphragms 17, 18 on the core piece 22. For reliable securing, the cover plates 23, 24 on the one hand and the core piece 22 on the other form a tongue-and-groove connection 25 for the diaphragms.

In the region of the covering plates 23, 24, the actuating lines 14, 15 adjoin the valve housing 10 (centrally) and so form the pressure side for the actuation of the diaphragms 17, 18.

Figure 2:
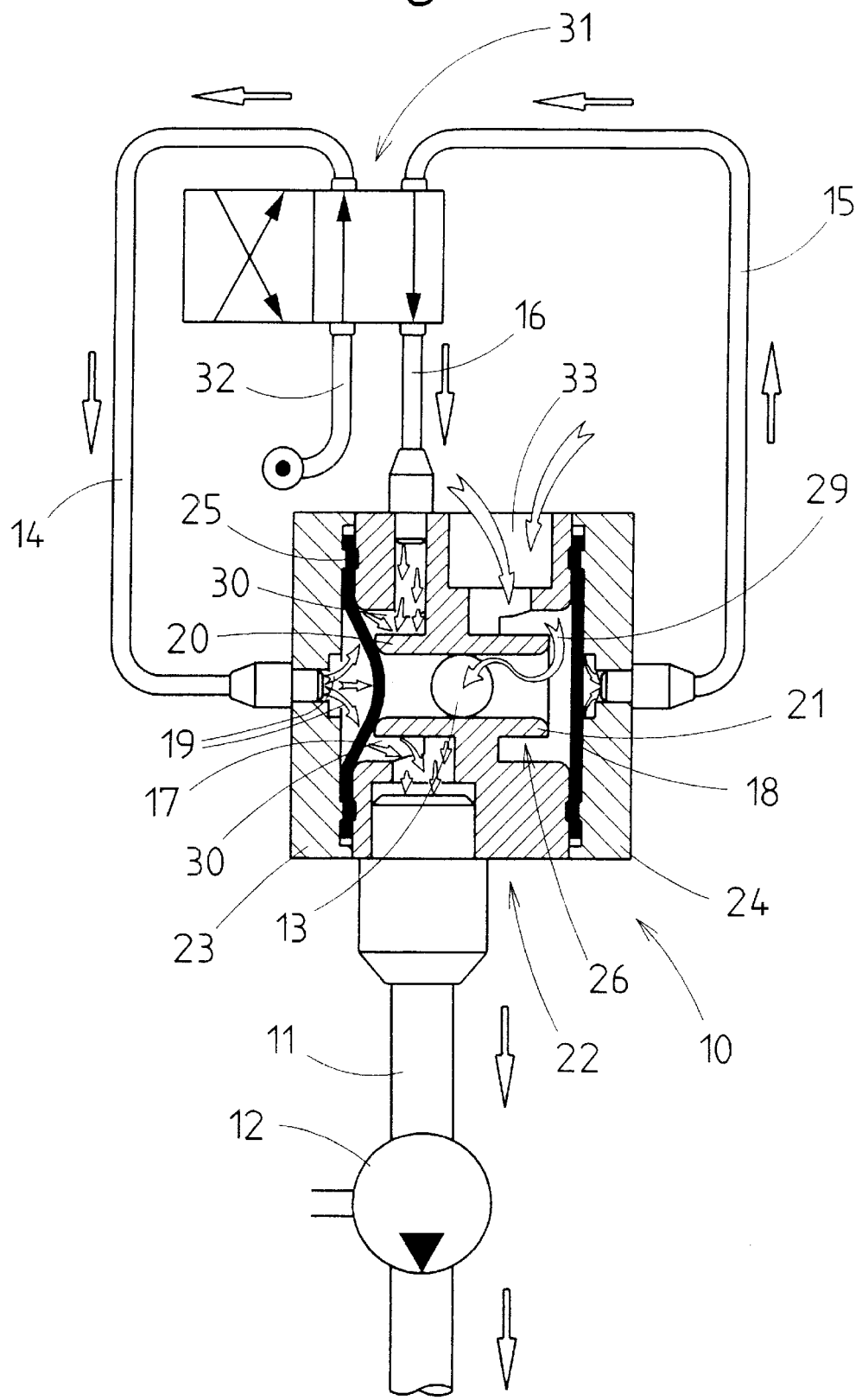
FIG. 2 shows the valve according to FIG. 1 in a changed open or closed position.
Figure 3:
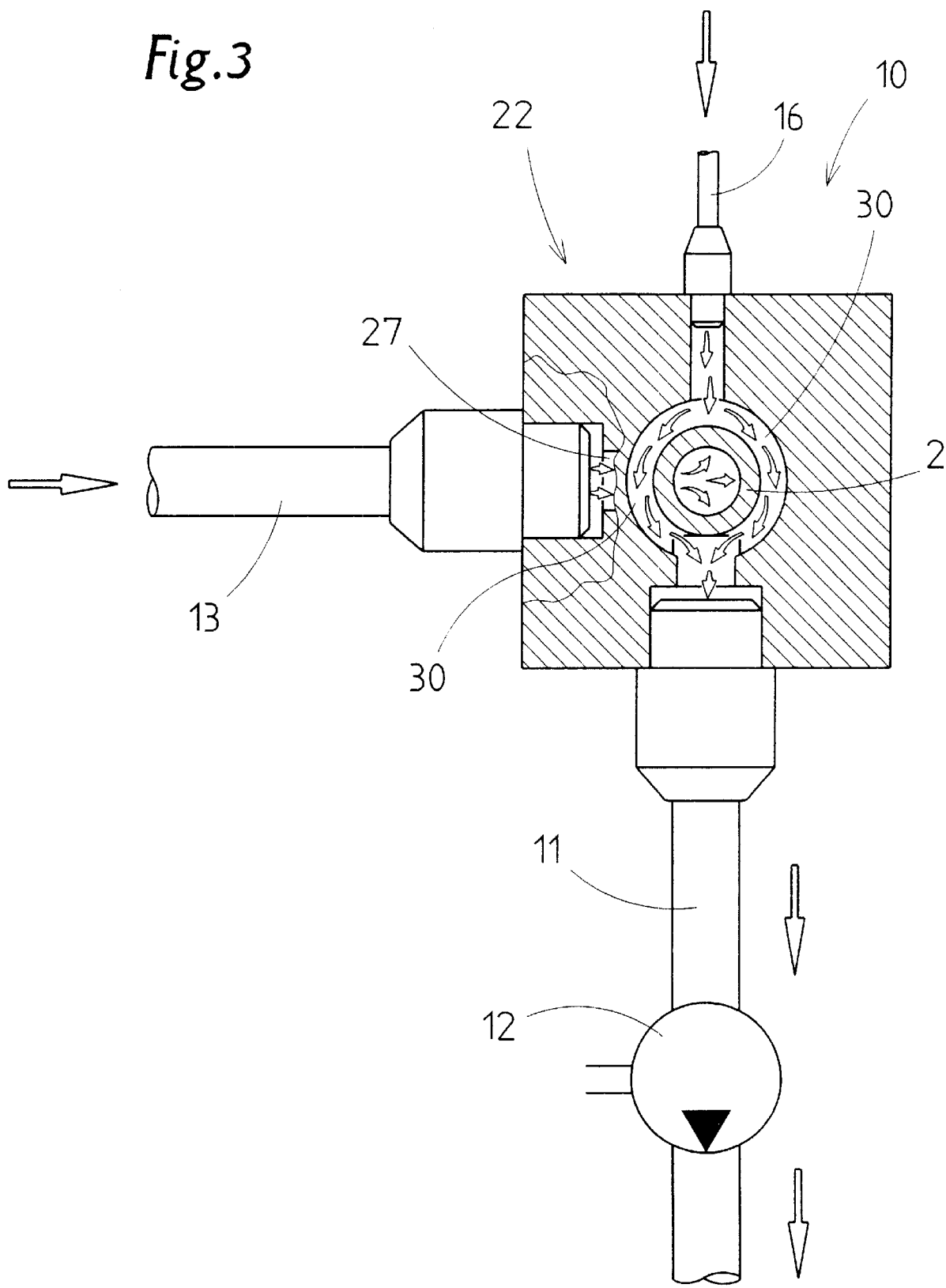
FIG. 3 shows a vertical section through the valve in a sectional plane III—III from FIG. 1.
Figure 4:
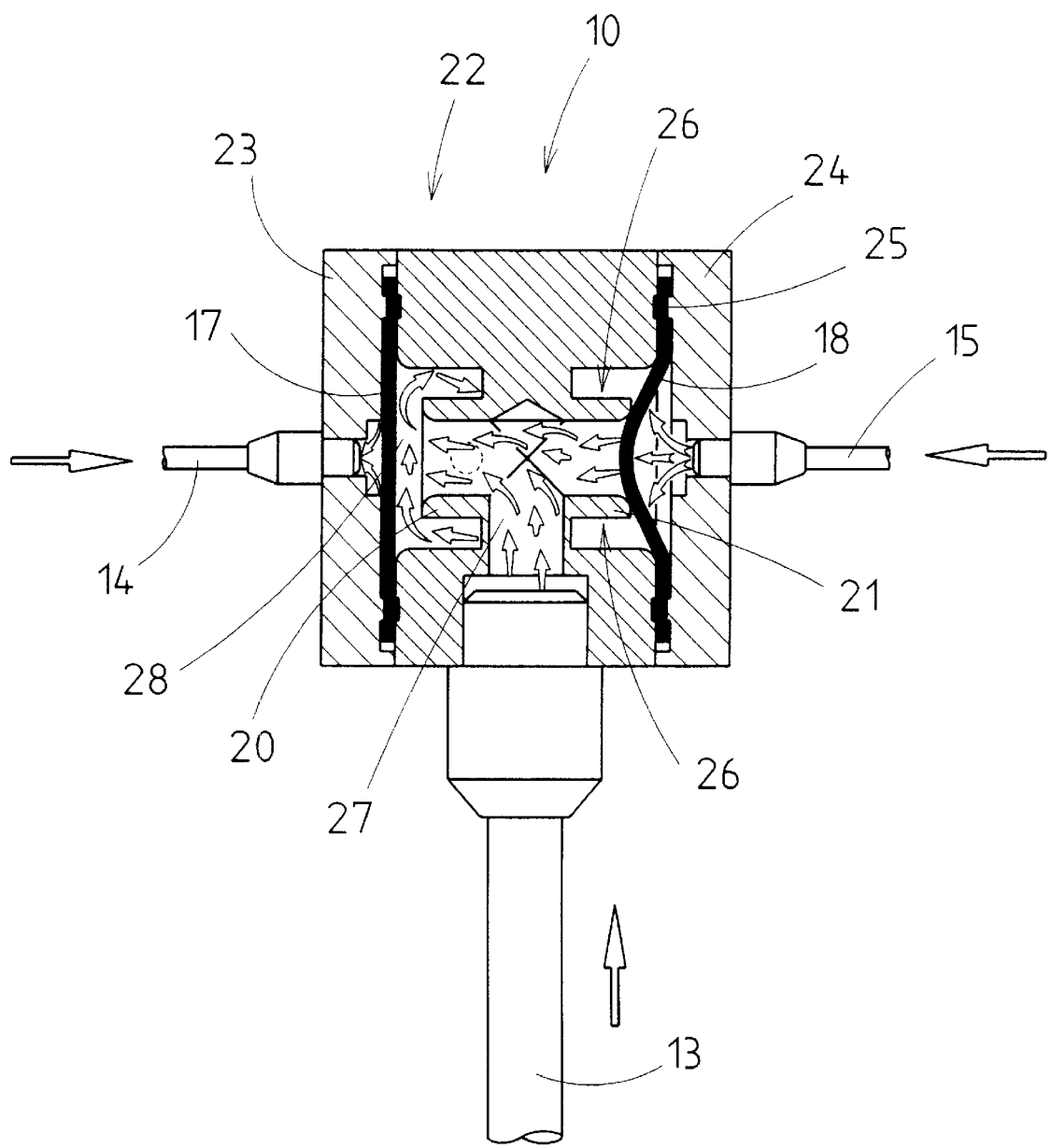
FIG. 4 shows a horizontal section through the valve in the sectional plane IV—IV from FIG. 1.

The core piece 22 has a plurality of flow passages and line connections. The supply line 11, the suction line 13 and the compensation line 16 directly adjoin the core piece 22. A flow pipe 26 is formed within the latter, centrally and in the transverse direction. This flow pipe 26 positioned transversely to the supply line 11 forms at the ends the valve seatings 20, 21 adjacent to the diaphragms 17, 18. The consumer line, specifically the suction line 13, adjoins the flow pipe 26 via a passage piece 27 at the longitudinal centre (FIG. 4). The ends of the flow pipe 26, in other words the valve seatings 20, 21, lie at a distance from the diaphragm 17, 18 when the latter is relaxed, so that in the open position of the respective closing element an open flow passage 28 (FIG. 1) or 29 (FIG. 2) is formed between diaphragm 17, 18 and flow pipe 26. As a result of the design and arrangement of the flow pipe 26 within the housing an annular duct 30 is additionally formed at the outside of the flow pipe 26, this being free even when the diaphragm 17 is closed and connecting the compensation line 16 to the supply line 11 (FIGS. 2 and 3).

The actuation of the diaphragms 17, 18 can be controlled by a pilot valve 31. This is a 4/2-way valve. The actuating lines 14, 15 are connected to the pilot valve 31. Furthermore, a central compressed air line 32 leads from a compressed air source, in particular a central compressed air supply on the machine side, to the pilot valve 31. Finally, the compensation line 16 is also connected to the pilot valve 31.

In the position shown in FIG. 1, the actuating line 15 for the diaphragm 18 is connected via the pilot valve 31 to the compressed air line 32. The diaphragm 18 is deformed by means of compressed air (arrows 19) into the closed position.

In this position of the pilot valve 31, the actuating line 14 is connected to the compensation line 16. Via the flow passage 28, a connection to the supply line 11 and hence to the vacuum pump 12 is formed. Via the actuating line 14, a vacuum or subatmospheric pressure is transmitted in this manner to the outside of the diaphragm 17, with the consequence that the switching operation, specifically the return of the diaphragm 17 from a closed position (FIG. 2) to the open position (FIG. 1) is assisted by subatmospheric pressure on the free side.

Moreover, in the position shown in FIG. 1, the consumer line, in other words the suction line 13, is connected via the flow pipe 26 and the flow passage 28 to the subatmospheric pressure source, specifically via the supply line 11. In this position, then, the suction heads are subjected to the action of subatmospheric pressure.

By adjusting the pilot valve 31 into the position shown in FIG. 2, the actuating line 14 is connected to the compressed air source or to the compressed air line 32. The diaphragm 17 is pressed against the neighbouring valve seating 20, while simultaneously the diaphragm 18 returns into the open position, bearing on the cover plate 24. This opening operation is assisted by the fact that the actuating line 15 is connected via the compensation line 16 and the annular duct 30 to the vacuum pump 12, in other words subatmospheric pressure is generated on the back of the diaphragm 18.

As a result of the opening of the diaphragm 18, a ventilation port 33—disposed on the upper side of the core piece 22—is exposed. This is now connected via the flow passage 29 and the flow pipe 26 to the consumer line, in other words to the suction line 13. This is accordingly vented, and the connected suction heads release the article picked up.

The design of the valve and/or the disposition of the elastically deformable closing elements—diaphragms 17, 18—has the result of ensuring that the latter are always loaded in the closed position on the closing side, in other words on the side facing the valve seating 20, 21, with subatmospheric pressure, so that no compressive forces counteract the closing force exerted by compressed air from the actuating lines 14, 15.

List of references

10 Valve housing
11 Supply line
12 Vacuum pump
13 Suction line
14 Actuating line
15 Actuating line
16 Compensation line
17 Diaphragm
18 Diaphragm
19 Arrow
20 Valve seating
21 Valve seating
22 Core piece
23 Cover plate
24 Cover plate
25 Tongue-and-groove connection
26 Flow pipe
27 Passage piece
28 Flow passage
29 Flow passage
30 Annular duct
31 Pilot valve
32 Compressed air line
33 Ventilation port

What is claimed is:

1. A valve having a valve housing (10), valve apertures, and elastic diaphragms (17, 18) acting as movable closing elements for the valve apertures, in which the elastic diaphragms (17, 18) are actuated by a pressure-exerting medium, comprising:

a. a supply line (11) connecting the valve housing (10) to a vacuum pump (12);

b. a suction line (13) connecting the valve housing (10) to a suction head;

c. a ventilation port (33) through the valve housing (10) allowing fluid communication between the interior of the valve housing (10) and the exterior of the valve housing (10);

d. two valve seats (20, 21) within the valve housing (10) cooperating respectively with the valve apertures, each of the two valve seats (20, 21) having one of the elastic diaphragms (17, 18) respectively as a closure element; and e. two actuating lines (14, 15) cooperating respectively with the elastic diaphragms (17, 18), each of the two actuating lines (14, 15) allowing fluid communication between the elastic diaphragms (17, 18) respectively and the pressure exerting medium, wherein when the elastic diaphragms (17, 18) are in an undeformed position the elastic diaphragms (17, 18) are in an opened position and do not abut the respective valve seats (20, 21), and when the elastic diaphragms (17, 18) are in a deformed position the elastic diaphragms (17, 18) are in a closed position and abut the respective valve seats (20, 21); and wherein when the pressure-exerting medium is applied via a first of the two actuating lines (14, 15) to one of the elastic diaphragms (17, 18), the one of the elastic diaphragms (17, 18) is deformed into the closed position, whereby when a first of the two elastic diaphragms (17, 18) is in the opened position, a second of the two elastic diaphragms (17, 18) is in the closed position and a connection between the supply line (11) and the suction line (13) within the valve housing (10) is open, and when the second of the two elastic diaphragms (17, 18) is in the opened position, the first of the two elastic diaphragms (17, 18) is in the closed position and the connection between the supply line (11) and the suction line (13) is closed and a connection between the suction line (13) and the ventilation port (33) is open.

2. The valve according to claim 1, characterized in that the supply line (11) connects a source (12) of subatmospheric pressure to the valve housing (10) in order to transfer the subatmospheric pressure to the suction line (13), wherein the subatmospheric pressure transferred by the supply line (11) to a first side of the first of the elastic diaphragms (17, 18) and the pressure-exerting medium from one of the two actuating lines (14, 15) applied to a second side of the first of the elastic diaphragms (17, 18) act on the first of the elastic diaphragms (17, 18) in order to deform the first of the elastic diaphragms (17, 18) into the closed position.

3. The valve according to claim 2, characterized in that the suction line (13) is connected to a flow pipe (26) to supply a vacuum to a suction head of a lifting device, and in that the flow pipe (26) is connected to the supply line (11) to a source (12) of subatmospheric pressure when a first of the elastic diaphragms (18) is in the closed position and the second of the elastic diaphragms (17) is in the opened position.

4. The valve according to claim 2, characterized in that when one of the elastic diaphragms (18) is in the opened position, the suction line (13) is connected via a flow pipe (26) to the ventilation port (33).

5. The valve according to claim 2, characterized in that the source (12) of subatmospheric pressure is the vacuum pump.

6. The valve according to claim 1, further comprising a flow pipe (26) formed in the valve housing (10), wherein the flow pipe (26) has two ends both of which are formed as the valve seats (20, 21) with each of the valve seats (20, 21) lying centrally opposite a relevant one of the elastic diaphragms (17, 18).

7. The valve according to claim 6, characterized in that the flow pipe (26) is adjoined in the transverse axial direction by at least one suction line (13).

8. The valve according to claim 6, further comprising a flow channel (28, 29) that is open when the relevant one of the elastic diaphragms (17, 18) is in the opened position, the flow channel (28, 29) being formed between the two ends of the flow pipe (26) and the relevant one of the elastic diaphragms (17, 18).

9. The valve according to claim 8, characterized in that the flow pipe (26) is adjoined in the transverse axial direction by at least one suction line (13).

10. The valve according to claim 6, further comprising a compensation line (16) permanently connected to the supply line (11) and leading to the source of subatmospheric pressure (12) proximal to the outside of the flow pipe (26).

11. The valve according to claim 10, characterized in that the supply line (11) is connected to the source (12) of subatmospheric pressure via an annular duct (30).

12. The valve according to claim 6, characterized in that:
   a. the elastic diaphragms (17, 18) are alternately subjected to the action of the pressure-exerting medium;
   b. one of the two actuating lines (14, 15) is assigned to each of the elastic diaphragms (17, 18) to transmit the pressure-exerting medium to the respective assigned elastic diaphragm (17, 18);
   c. the pressure-exerting medium is fed by the respective one of the two actuating lines (14, 15) to the respective assigned elastic diaphragm (17, 18) on a side of the respective assigned elastic diaphragm (17, 18) facing away from the valve seat (20, 21); and
   d. the actuating lines (14, 15) are connected to a common pressure-exerting medium source (32).

13. The valve according to claim 12, characterized in that the two actuating lines (14, 15) are connected to the pressure-exerting medium source (32) via a pilot valve (32).

14. The valve according to claim 12, characterized in that the pressure-exerting medium (32) is a compressed air source supplied through a compressed air line.

15. The valve according to claim 1, characterized in that subatmospheric pressure is applied on a first side of the elastic diaphragms (17, 18) through a respective one of the two actuating lines (14, 15), the subatmospheric pressure being appropriately applied by positioning a pilot valve (31) in a manner such that the respective one of the two actuating lines (14, 15) is connected to a source (12) of subatmospheric pressure via a compensation line (16).

16. The valve according to claim 1, characterized in that when the connection between the supply line (11) and the suction line (13) is interrupted by an abutment of the first of the elastic diaphragms (17) on the respective valve seat (20), the actuating line (15) for the second of the elastic diaphragms (18) is connected within the valve housing (10) to the supply line (11) such that subatmospheric pressure is conveyed via the actuating line (15) to a side of the second of the elastic diaphragms (18) facing away from the respective valve seat (21).

17. The valve according to claim 16, further comprising a flow pipe (26) formed within the valve housing (10), characterized in that the valve seats (20, 21) are annular, are formed at each of two ends of the flow pipe (26), the valve seats (20, 21) lying centrally opposite to the elastic diaphragms (17, 18), wherein the elastic diaphragms (17, 18) are disposed at a distance from a respective one of the valve seats (20, 21) when the elastic diaphragms (17, 18) are in the opened position and the elastic diaphragms (17, 18) abut the respective one of the valve seats (20, 21) when the elastic diaphragms are in the closed position.

18. The valve according to claim 17, wherein the suction line (13) is joined to the flow pipe (26) in a transverse axial direction, and the flow pipe (26) is connected to the supply line (11) by a flow channel (28) when one of the valve seats (20) is open.

19. The valve according to claim 1, wherein the two actuating lines (14, 15) are connected to a common pilot valve (31), each of the two actuating lines (14, 15) is connected to a pressure line (32) when the pilot valve is in a first position and connected to a compensation line (16) when the pilot valve is in a second position, the compensation line (16) is further connected to the valve housing (10) and communicates with the supply line (11) and the vacuum pump (12) for conveying negative pressure to a side of at least one of the elastic diaphragms (17, 18) facing away from the respective valve seats (20, 21).

20. The valve according to claim 19, wherein the valve housing (10) further comprises a core section (22) and cover plates (23, 24) disposed on opposite sides of the core section (22), wherein the elastic diaphragms (17, 18) span between the core section (22) and the associated cover plates (23, 24), and each of the two actuating lines (14, 15) is connected to one or the other of the cover plates (23, 24).

21. The valve according to claim 20, wherein a flow pipe (26) is arranged centrally within the core section (22) and is disposed in a transverse axial direction to the supply line (11) and to the compensation line (16).

* * * * *